US012579985B2

(12) United States Patent
Kanevsky et al.

(10) Patent No.: US 12,579,985 B2
(45) Date of Patent: Mar. 17, 2026

(54) GENERATING TRANSCRIPTIONS OF AUDIO DATA FOR PRESENTATION AT A CLIENT DEVICE

(71) Applicant: Google LLC, Mountain View, CA (US)

(72) Inventors: Dimitri Kanevsky, Ossining, NY (US); Sharlene Yuan, Taipei (TW); Artem Dementyev, Newton, MA (US); Sagar Savla, San Francisco, CA (US); Vinton Gray Cerf, McLean, VA (US)

(73) Assignee: Google LLC, Mountain View, CA (US)

( * ) Notice: Subject to any disclaimer, the term of this patent is extended or adjusted under 35 U.S.C. 154(b) by 88 days.

(21) Appl. No.: 18/511,095

(22) Filed: Nov. 16, 2023

(65) Prior Publication Data

US 2025/0166633 A1 May 22, 2025

(51) Int. Cl.
| | |
|---|---|
| *G10L 17/06* | (2013.01) |
| *G06F 3/0482* | (2013.01) |
| *G06F 3/0484* | (2022.01) |
| *G09B 21/00* | (2006.01) |
| *H04H 20/86* | (2008.01) |

(52) U.S. Cl.
CPC ............ *G10L 17/06* (2013.01); *G06F 3/0482* (2013.01); *G06F 3/0484* (2013.01); *H04H 20/86* (2013.01); *G09B 21/009* (2013.01)

(58) Field of Classification Search
CPC ....... G10L 17/06; G10L 15/26; G10L 15/063; G10L 15/18; G10L 15/22; H04H 20/86; G06F 3/0482; G06F 3/0484; G06F 3/011; G06F 3/167; G06F 3/017; G09B 21/009
See application file for complete search history.

(56) References Cited

U.S. PATENT DOCUMENTS

| | | | | |
|---|---|---|---|---|
| 7,676,372 B1 * | 3/2010 | Oba | ..................... | G09B 21/009 |
| | | | | 704/271 |
| 2017/0243582 A1 * | 8/2017 | Menezes | ............. | G10L 13/0335 |
| 2020/0043496 A1 * | 2/2020 | Abdulkader | ......... | G06N 3/0499 |
| 2020/0321007 A1 * | 10/2020 | Stoker | ..................... | G10L 15/26 |
| 2022/0066207 A1 * | 3/2022 | Croxford | .............. | G06V 40/20 |
| 2022/0139400 A1 * | 5/2022 | Cheung | .................. | H04N 7/157 |
| | | | | 704/235 |
| 2023/0260534 A1 * | 8/2023 | Escudero | ................ | H04S 1/007 |
| | | | | 704/3 |

* cited by examiner

*Primary Examiner* — Yogeshkumar Patel
(74) *Attorney, Agent, or Firm* — Lowenstein Sandler LLP

(57) ABSTRACT

Systems and methods for generating transcriptions of audio data for presentation at a client device are provided. One or more audio streams, provided by one or more audio sources of one or more client devices of a plurality of users, are received by a broadcasting system. Sensory modality information comprising one or more of auditory, visual, or haptic characteristics of a first user is determined. First audio data from the one or more audio streams corresponding to the first user and additional audio data from the one or more audio streams corresponding to other users are determined using one or more machine learning models. At least one of a first transcription of the first audio data or one or more additional transcription of one or more of the additional audio data are provided for presentation at a first client device according to the auditory, visual, or haptic characteristics.

20 Claims, 10 Drawing Sheets

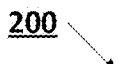

Receive, from a broadcasting system, one or more audio streams provided by one or more audio sources of one or more client devices of a plurality of client devices of a plurality of users of the broadcasting system 210

Determine sensory modality information pertaining to a first user of the plurality of users, wherein the sensory modality information comprises one or more of auditory, visual, or haptic characteristics of the first user 220

Determine, using one or more machine learning models, first audio data from the one or more audio streams corresponding to the first user and additional audio data from the one or more audio streams corresponding to other users of the plurality of users 230

Provide at least one of a first transcription of the first audio data or one or more additional transcriptions of one or more of the additional audio data for presentation at a first client device according to the auditory, visual, or haptic characteristics of the first user comprised by the sensory modality information 240

FIG. 2

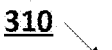
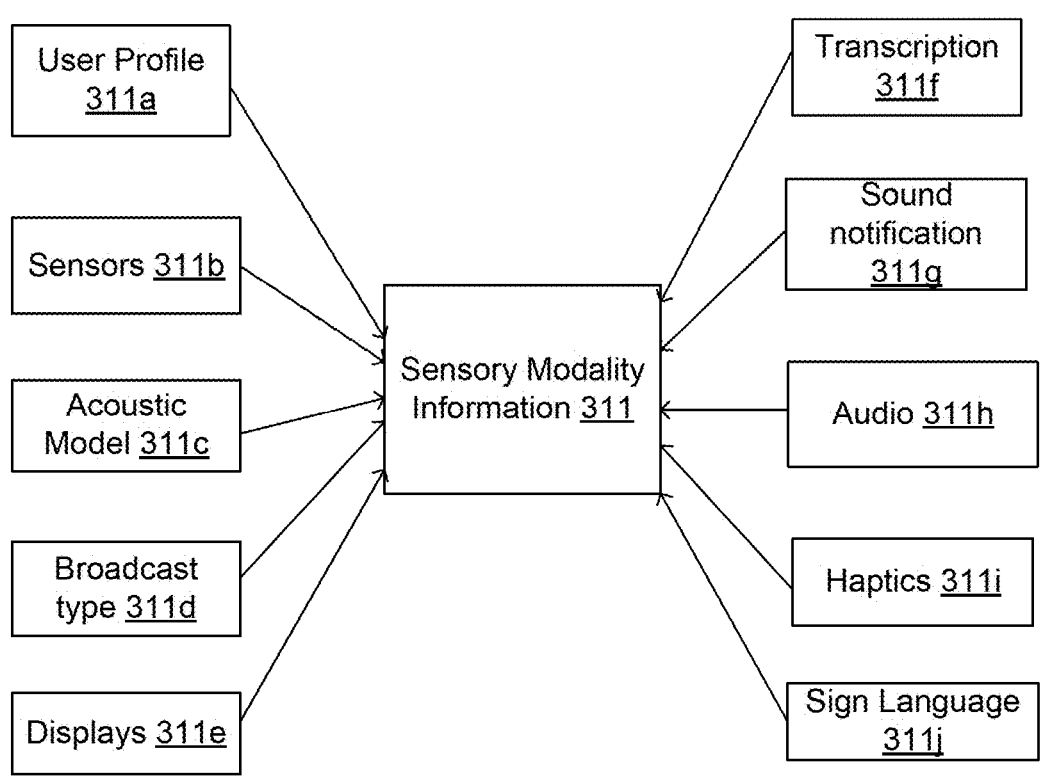
FIG. 3A

Figure 3B:
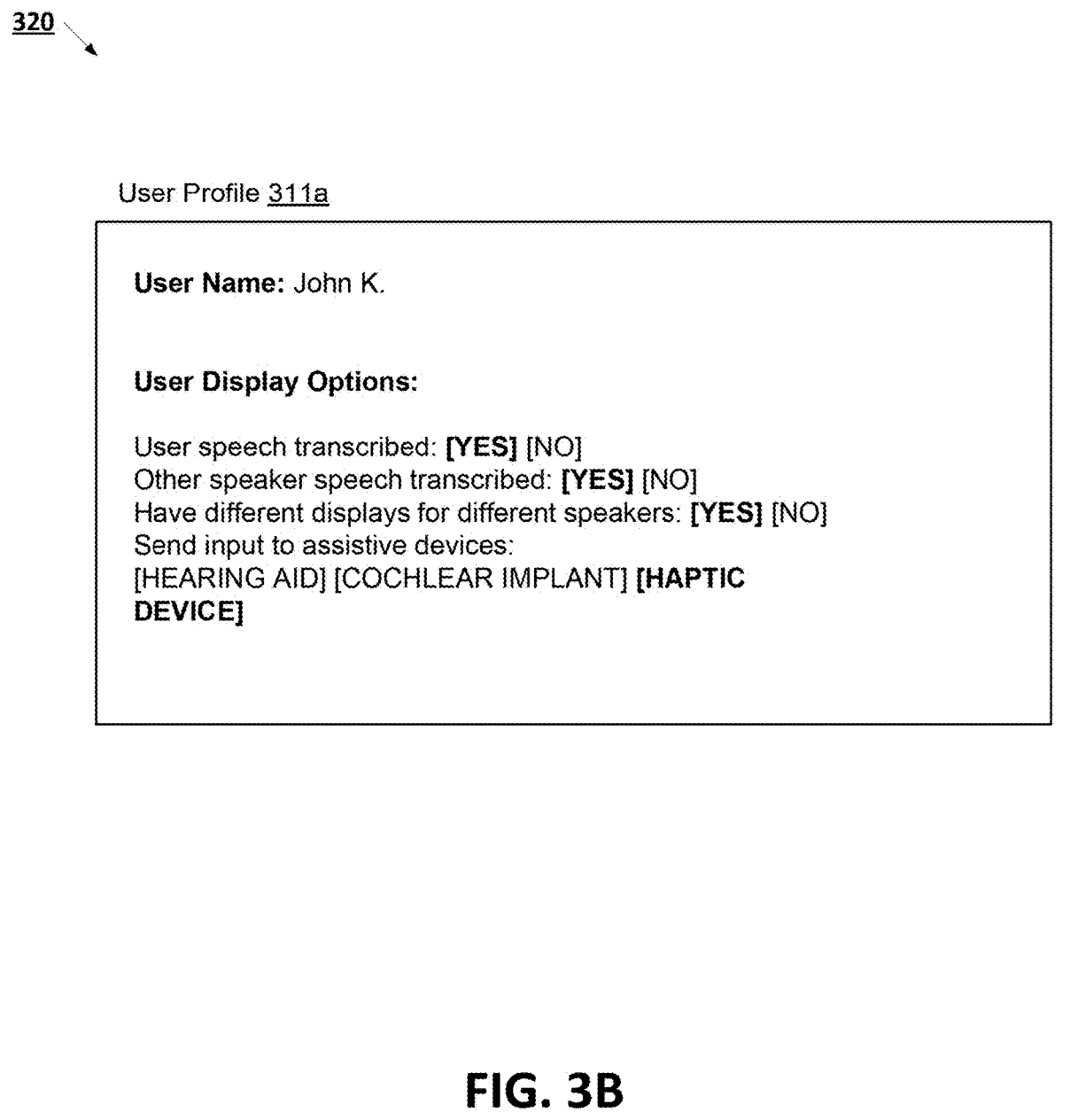

320

User Profile <u>311a</u>

User Name: John K.

User Display Options:

User speech transcribed: [YES] [NO]
Other speaker speech transcribed: [YES] [NO]
Have different displays for different speakers: [YES] [NO]
Send input to assistive devices:
[HEARING AID] [COCHLEAR IMPLANT] [HAPTIC DEVICE]

Figure 3C:
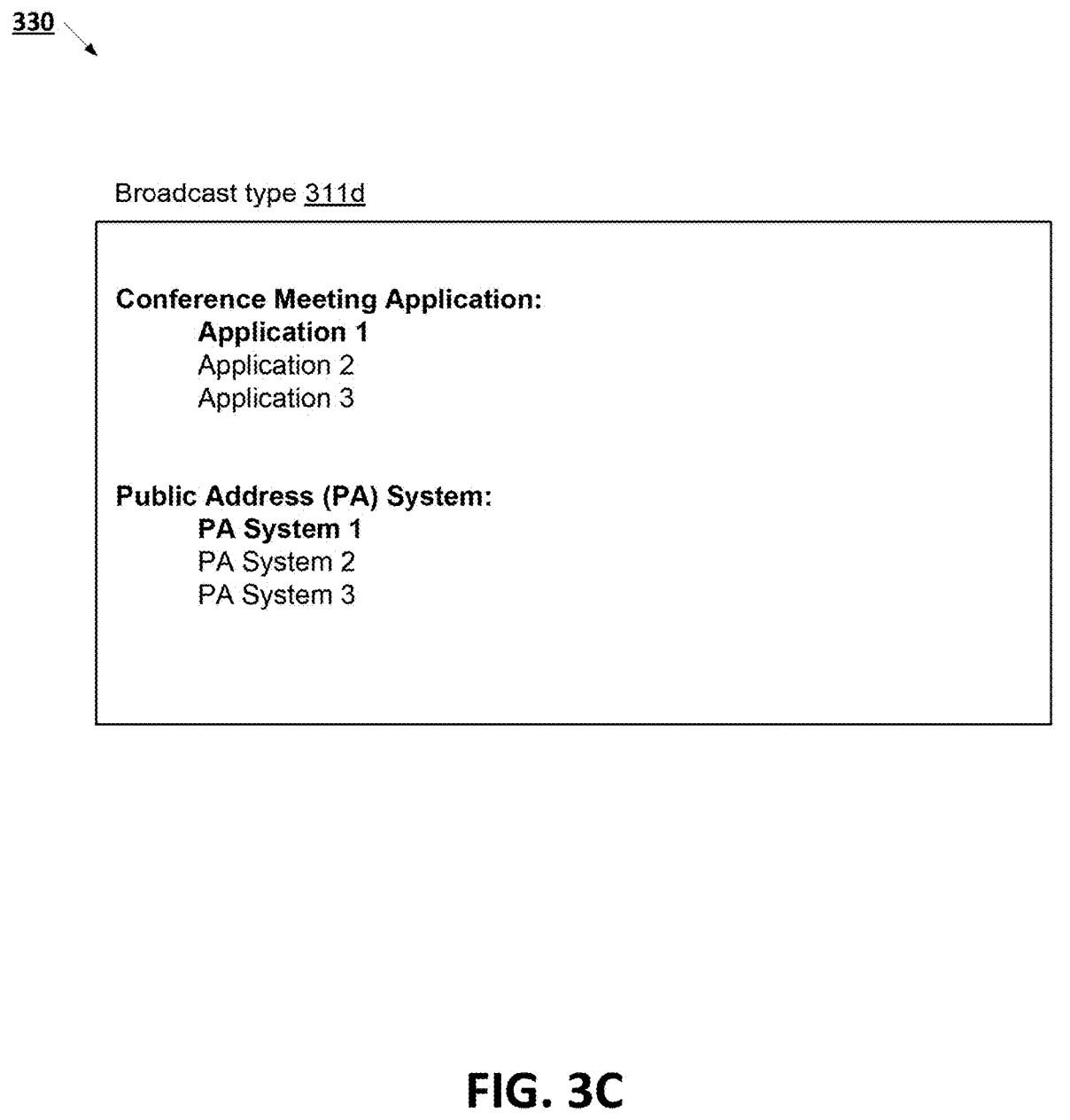

Broadcast type 311d

Conference Meeting Application:
    Application 1
    Application 2
    Application 3

Public Address (PA) System:
    PA System 1
    PA System 2
    PA System 3

Acoustic model 311c

User: Chet
General Speakers: [JOHN] [MIKE] [LENA]
Language:
  English
  Russian

Figure 3E:
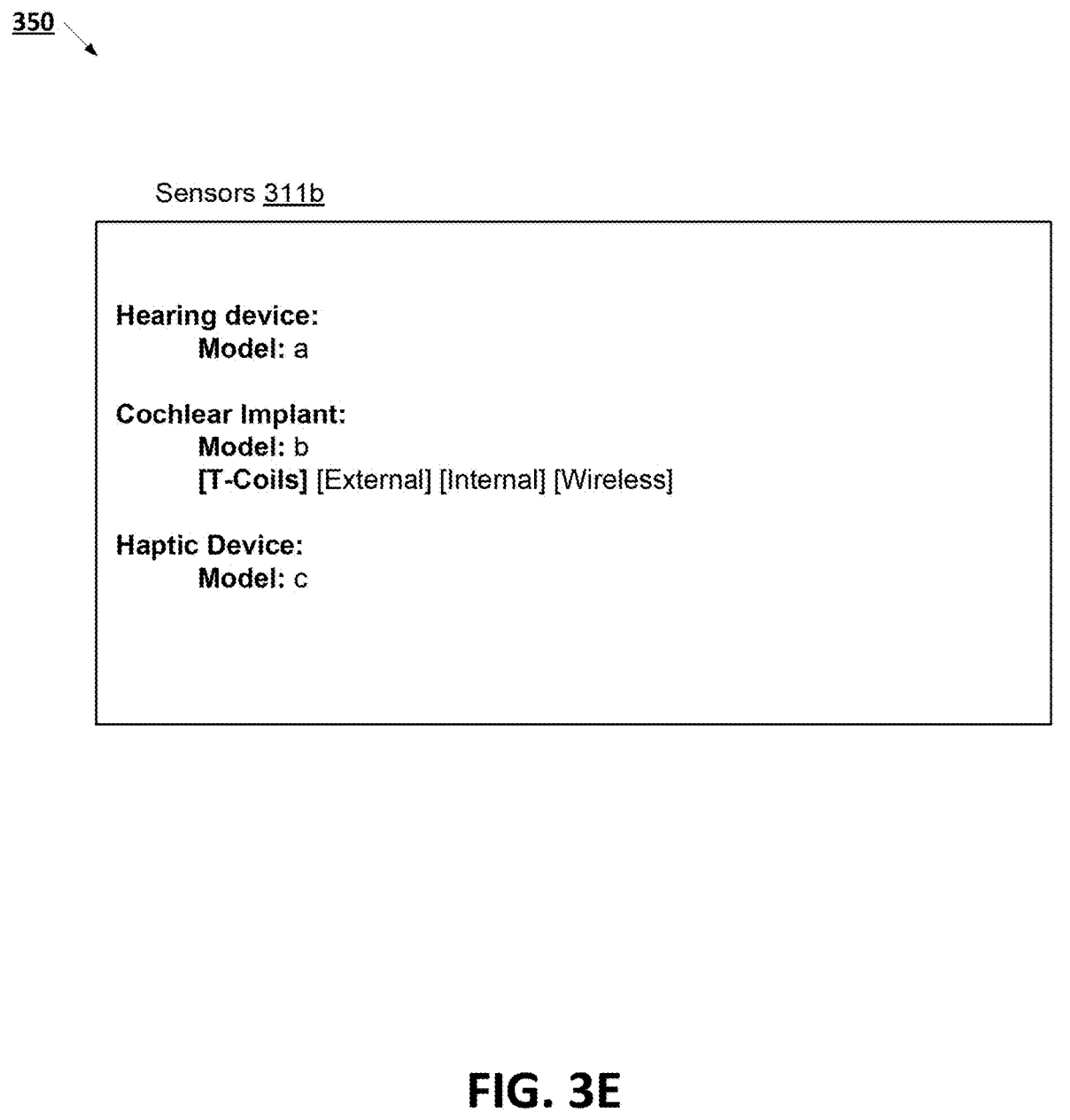

Sensors 311b

Hearing device:
        Model: a

Cochlear Implant:
        Model: b
        [T-Coils] [External] [Internal] [Wireless]

Haptic Device:
        Model: c

Displays 311e

Mobile device:
    [one screen] [dual screen]

Laptop

TV

Monitor

GENERATING TRANSCRIPTIONS OF AUDIO DATA FOR PRESENTATION AT A CLIENT DEVICE

TECHNICAL FIELD

Aspects and implementations of the present disclosure relate to generating transcriptions of audio data for presentation at a client device.

BACKGROUND

Transcription typically involves the process of converting audio data into text to facilitate accessibility and comprehension for individuals. In particular, transcription can be an important tool for individuals with hearing impairments, language barriers, different accents, speech impediments, etc. In addition, an individual can encounter situations where transcriptions are needed for multiple sources of audio data simultaneously, such as local environmental sounds (e.g., a baby crying), local speech (e.g., a person speaking to the individual in person, public announcement (PA) systems, etc.), remote speech (e.g., a person speaking over a conference call), etc. In such situations, the individual may have particular needs and preferences for how to treat each different source of audio data. For example, the individual may want to treat the local environmental sounds as background noise which does not need a transcription, and the individual may want to treat the local speech and the remote speech as both needing to be transcribed. However, conventional transcription services primarily target a broad audience and thus typically produce standard transcriptions, which often fail to meet the diverse needs and preferences of individual users.

SUMMARY

The below summary is a simplified summary of the disclosure in order to provide a basic understanding of some aspects of the disclosure. This summary is not an extensive overview of the disclosure. It is intended neither to identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

An aspect of the disclosure provides a computer-implemented method that includes receiving, by a broadcasting system, one or more audio streams provided by one or more audio sources of one or more client devices of a plurality of client devices of a plurality of users of the broadcasting system. The method further includes determining sensory modality information pertaining to a first user of the plurality of users, wherein the sensory modality information comprises one or more of auditory, visual, or haptic characteristics of the first user. The method further includes determining, using one or more machine learning models, first audio data from the one or more audio streams corresponding to the first user and additional audio data from the one or more audio streams corresponding to other users of the plurality of users. The method further includes providing at least one of a first transcription of the first audio data or one or more additional transcriptions of one or more of the additional audio data for presentation at a first client device according to the auditory, visual, or haptic characteristics of the first user comprised by the sensory modality information.

In some implementations, the one or more audio streams provided by the one or more audio sources of the one or more client devices are provided as input to the machine learning model.

In some implementations, the at least one of the first transcription of the first audio data or the one or more additional transcriptions of the one or more additional audio data is presented on a user interface (UI) of the first client device, wherein the UI comprises one or more display areas, each to display one of the at least one of the first transcription or the one or more additional transcriptions, and one or more UI elements selectable to (i) display the at least one of the first transcription or the one or more additional transcriptions, and (ii) display descriptive information pertaining to the sensory modality information pertaining to the first user.

In some implementations, the at least one of the first transcription of the first audio data or the one or more additional transcriptions of the one or more additional audio data is broadcasted to a conference meeting, wherein each of the plurality of users is a participant of a plurality of participants of the conference meeting.

In some implementations, the one or more audio streams is provided by a public address (PA) system connected to the one or more client devices.

In some implementations, the first client device comprises a hearing device, a computer device, a mobile device, an audio assistive device, or a haptic assistive device.

In some implementations, the method further includes providing one or more sign language visual aids for the at least one of a first transcription or the one or more additional transcriptions for presentation at the first client device according to the auditory, visual, or haptic characteristics of the first user comprised by the sensory modality information.

In some implementations, the method further includes providing one or more sound notifications pertaining to the at least one of a first transcription or the one or more additional transcriptions for presentation at the first client device according to the auditory, visual, or haptic characteristics of the first user comprised by the sensory modality information.

In some implementations, the one or more machine learning models include a first machine learning model trained, based on speech of the first user, to identify the first audio data from the one or more audio streams corresponding to the first user, and a second machine learning model trained, based on speech of the second user, to identify second audio data from the one or more audio streams corresponding to the second user. The method further includes providing the one or more audio streams provided by the one or more audio sources of the one or more client devices as an input to the second machine learning model. The method further includes providing a second transcription of the second audio data for presentation at a second client device according to the auditory, visual, or haptic characteristics of the second user comprised by the sensory modality information.

An aspect of the disclosure provides a system including a memory device and a processing device communicatively coupled to the memory device. The processing device performs operations including receiving, by a broadcasting system, one or more audio streams provided by one or more audio sources of one or more client devices of a plurality of client devices of a plurality of users of the broadcasting system. The processing device performs operations further including determining sensory modality information pertaining to a first user of the plurality of users, wherein the sensory modality information comprises one or more of auditory, visual, or haptic characteristics of the first user. The processing device performs operations further including determining, using one or more machine learning models, first audio data from the one or more audio streams corresponding to the first user and additional audio data from the one or more audio streams corresponding to other users of the plurality of users. The processing device performs operations further including providing at least one of a first transcription of the first audio data or one or more additional transcriptions of one or more of the additional audio data for presentation at a first client device according to the auditory, visual, or haptic characteristics of the first user comprised by the sensory modality information.

In some implementations, the one or more audio streams provided by the one or more audio sources of the one or more client devices are provided as input to the machine learning model.

In some implementations, the at least one of the first transcription of the first audio data or the one or more additional transcriptions of the one or more additional audio data is presented on a user interface (UI) of the first client device, wherein the UI comprises one or more display areas, each to display one of the at least one of the first transcription or the one or more additional transcriptions, and one or more UI elements selectable to (i) display the at least one of the first transcription or the one or more additional transcriptions, and (ii) display descriptive information pertaining to the sensory modality information pertaining to the first user.

In some implementations, the at least one of the first transcription of the first audio data or the one or more additional transcriptions of the one or more additional audio data is broadcasted to a conference meeting, wherein each of the plurality of users is a participant of a plurality of participants of the conference meeting.

In some implementations, the one or more audio streams is provided by a public address (PA) system connected to the one or more client devices.

In some implementations, the first client device comprises a hearing device, a computer device, a mobile device, an audio assistive device, or a haptic assistive device.

In some implementations, the processing device performs operations further including providing one or more sign language visual aids for the at least one of a first transcription or the one or more additional transcriptions for presentation at the first client device according to the auditory, visual, or haptic characteristics of the first user comprised by the sensory modality information.

In some implementations, the processing device performs operations further including providing one or more sound notifications pertaining to the at least one of a first transcription or the one or more additional transcriptions for presentation at the first client device according to the auditory, visual, or haptic characteristics of the first user comprised by the sensory modality information.

In some implementations, the one or more machine learning models include a first machine learning model trained, based on speech of the first user, to identify the first audio data from the one or more audio streams corresponding to the first user, and a second machine learning model trained, based on speech of the second user, to identify second audio data from the one or more audio streams corresponding to the second user. The processing device performs operations further including providing the one or more audio streams provided by the one or more audio sources of the one or more client devices as an input to the second machine learning model; and providing a second transcription of the second audio data for presentation at a second client device according to the auditory, visual, or haptic characteristics of the second user comprised by the sensory modality information.

An aspect of the disclosure provides a computer program including instructions that, when the program is executed by a processing device, cause the processing device to perform operations including receiving, by a broadcasting system, one or more audio streams provided by one or more audio sources of one or more client devices of a plurality of client devices of a plurality of users of the broadcasting system. The processing device performs operations further including determining sensory modality information pertaining to a first user of the plurality of users, wherein the sensory modality information comprises one or more of auditory, visual, or haptic characteristics of the first user. The processing device performs operations further including determining, using one or more machine learning models, first audio data from the one or more audio streams corresponding to the first user and additional audio data from the one or more audio streams corresponding to other users of the plurality of users. The processing device performs operations further including providing at least one of a first transcription of the first audio data or one or more additional transcriptions of one or more of the additional audio data for presentation at a first client device according to the auditory, visual, or haptic characteristics of the first user comprised by the sensory modality information.

In some implementations, the one or more audio streams provided by the one or more audio sources of the one or more client devices are provided as input to the machine learning model.

In some implementations, the at least one of the first transcription of the first audio data or the one or more additional transcriptions of the one or more additional audio data is presented on a user interface (UI) of the first client device, wherein the UI comprises one or more display areas, each to display one of the at least one of the first transcription or the one or more additional transcriptions, and one or more UI elements selectable to (i) display the at least one of the first transcription or the one or more additional transcriptions, and (ii) display descriptive information pertaining to the sensory modality information pertaining to the first user.

In some implementations, the at least one of the first transcription of the first audio data or the one or more additional transcriptions of the one or more additional audio data is broadcasted to a conference meeting, wherein each of the plurality of users is a participant of a plurality of participants of the conference meeting.

In some implementations, the one or more audio streams is provided by a public address (PA) system connected to the one or more client devices.

In some implementations, the first client device comprises a hearing device, a computer device, a mobile device, an audio assistive device, or a haptic assistive device.

In some implementations, the processing device performs operations further including providing one or more sign language visual aids for the at least one of a first transcription or the one or more additional transcriptions for presentation at the first client device according to the auditory, visual, or haptic characteristics of the first user comprised by the sensory modality information.

In some implementations, the processing device performs operations further including providing one or more sound notifications pertaining to the at least one of a first transcription or the one or more additional transcriptions for presentation at the first client device according to the auditory, visual, or haptic characteristics of the first user comprised by the sensory modality information.

In some implementations, the one or more machine learning models include a first machine learning model trained, based on speech of the first user, to identify the first audio data from the one or more audio streams corresponding to the first user, and a second machine learning model trained, based on speech of the second user, to identify second audio data from the one or more audio streams corresponding to the second user. The processing device performs operations further including providing the one or more audio streams provided by the one or more audio sources of the one or more client devices as an input to the second machine learning model; and providing a second transcription of the second audio data for presentation at a second client device according to the auditory, visual, or haptic characteristics of the second user comprised by the sensory modality information.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

FIG. 2 depicts a flow diagram of a method for generating transcriptions of audio data for presentation at a client device, in accordance with implementations of the present disclosure.

FIG. 3A is a block diagram illustrating example audio, visual, or haptic characteristics comprised by sensory modality information of a user, in accordance with implementations of the present disclosure.

FIG. 3B is a block diagram illustrating an example user interface (UI) of a client device displaying example audio, visual, or haptic characteristics comprised by sensory modality information of a user, in accordance with implementations of the present disclosure.

FIG. 3C is a block diagram illustrating another example user interface (UI) of a client device displaying example audio, visual, or haptic characteristics comprised by sensory modality information of a user, in accordance with implementations of the present disclosure.

FIG. 3D is a block diagram illustrating another example user interface (UI) of a client device displaying example audio, visual, or haptic characteristics comprised by sensory modality information of a user, in accordance with implementations of the present disclosure.

FIG. 3E is a block diagram illustrating another example user interface (UI) of a client device displaying example audio, visual, or haptic characteristics comprised by sensory modality information of a user, in accordance with implementations of the present disclosure.

FIG. 3F is a block diagram illustrating another example user interface (UI) of a client device displaying example audio, visual, or haptic characteristics comprised by sensory modality information of a user, in accordance with implementations of the present disclosure.

DETAILED DESCRIPTION

Figure 1:
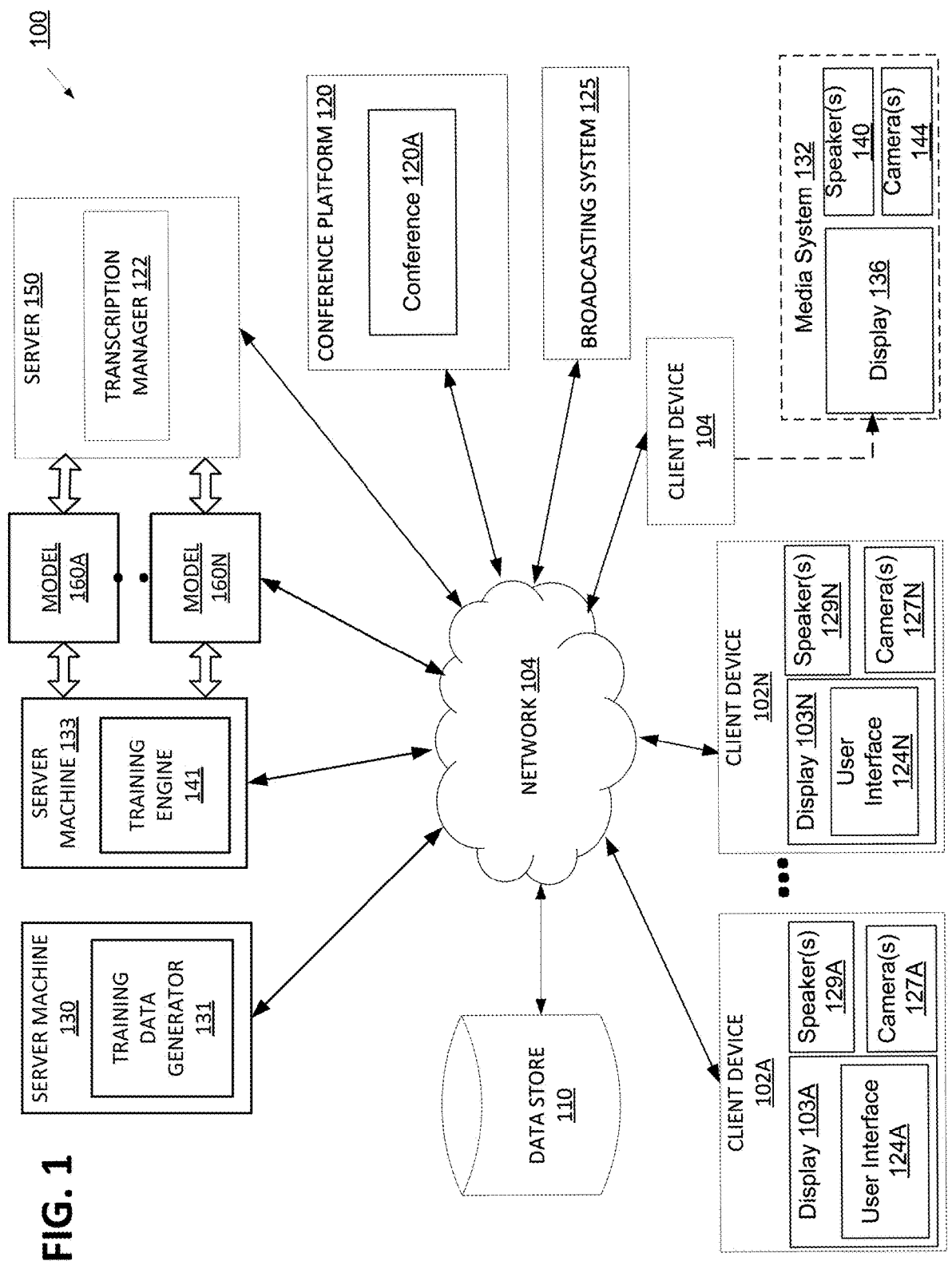
FIG. 1 illustrates an example system architecture, in accordance with implementations of the present disclosure.

Aspects of the present disclosure relate to generating transcriptions of audio data for presentation at a client device.

Generating a transcription of audio data typically involves converting the audio data into text to facilitate accessibility and comprehension for individuals. In particular, transcription can be an important tool for individuals with hearing impairments, language barriers, different accents, speech impediments, or other non-standard speech. In addition, an individual can encounter situations where transcriptions are needed for multiple sources of audio data simultaneously, such as local environmental sounds (e.g., a baby crying, a doorbell ringing, a dog barking, etc.), local speech (e.g., a person speaking to the individual in person, public announcement (PA) systems, etc.), remote speech (e.g., a person speaking over a conference call), etc. In such situations, the individual may have particular needs and preferences for how to treat each different source of audio data, including modality preferences (e.g., audio, visual, haptic, etc.). For example, the individual may want to treat the local environmental sounds as background noise which does not need a transcription, and to treat the local speech and the remote speech as both needing to be transcribed. In another example, the individual may want audio data to be delivered to the user's assistive device (e.g., a hearing aid, cochlear implant, etc.). In another example, the individual may want to receive sound notifications for the local environmental sounds (e.g., a text label that describes each local environmental sound). In another example, the individual may want to receive haptic signals (e.g., vibrations in particular patterns) if certain trigger words (e.g., a flight number) are detected within audio data. In another example, the individual may want to receive sign language visual aids for a transcription of audio data.

Conventional transcription services, however, primarily target a broad audience and thus typically produce standard transcriptions for everyone, neglecting the diverse needs and preferences of individual users. Some conventional transcription services attempt to address the particular needs and preferences of individual users by using a distributed system of microphones, where each microphone records the audio of each individual user and sends the audio data to a server for transcription. The transcription is then sent to each individual user's device. However, this technology typically requires that each individual user has specialized hardware (e.g., the technology-specific microphone), which is not always possible. Further, this specific technology requires that all individual users be in the same physical location, which forecloses situations where users are located remotely and participate in a conversation over, for example, a conference call.

Implementations of the present disclosure address the above and other deficiencies by using machine learning to generate transcriptions of audio data for presentation at a client device, where the transcriptions take into account the particular needs and preferences of an individual user. An audio stream provided by an audio source of a client device of a user can be received by a broadcasting system (e.g., a transcription broadcasting system). Sensory modality information pertaining to the user (e.g., auditory, visual, or haptic characteristics) can be determined. Audio data that corresponds to the user and additional audio data corresponding to other users can be determined using one or more trained machine learning models. For example, a machine learning model can be trained on speech of the user to identify the particular user's speech from audio data. At least one or more transcriptions of the audio data that corresponds to the user or the additional audio data corresponding to the other users can be provided for presentation at the client device of the user according to the auditory, visual, or haptic characteristics of the user. Thus, the user can receive transcriptions of audio data according to the particular preferences and needs of the user, enabling the user to be able to better comprehend the audio data. Further, if the user is participating in a conference meeting, the user can more efficiently participate in the conference meeting with improved communication due to receiving transcriptions of audio data that are tailored to the particular user. For example, the user can better communicate and connect with the other participants of the video conference by being able to better understand the other participants.

Aspects of the present disclosure provide technical advantages over previous solutions. Aspects of the present disclosure can provide a tool that uses trained machine learning models to assist in providing multi-modal (e.g., audio, visual, haptics) and different categories of information (e.g., transcriptions, sound notifications, sign language visual aids, etc.) that cater to the diverse needs and preferences of individuals. Further, this tool can be integrated into various services, such as conference platforms, which can allow users to more efficiently participate in conference meetings with improved communication. Such additional functionality can also result in more efficient use of processing resources utilized to facilitate the connection between client devices by avoiding consumption of computing resources needed to support participants (e.g., users) having to facilitate better comprehension during the conference call (e.g., by disrupting the conference call by unmuting to ask a question, etc.) if the transcriptions are inaccurate and/or inadequate for particular participants, thereby resulting in an increase of overall efficiency of the conference platform.

FIG. 1 illustrates an example system architecture 100, in accordance with implementations of the present disclosure. The system architecture 100 (also referred to as "system" herein) includes client devices 102A-N, one or more client devices 104, a data store 110, a conference platform 120, a broadcasting system 125, a server machine 130, a server machine 133, and/or a server 150, each connected to a network 104.

In implementations, network 104 can include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof.

In some implementations, data store 110 is a persistent storage that is capable of storing data as well as data structures to tag, organize, and index the data. A data item can include audio data, in accordance with embodiments described herein. Data store 110 can be hosted by one or more storage devices, such as main memory, magnetic or optical storage-based disks, tapes or hard drives, NAS, SAN, and so forth. In some implementations, data store 110 can be a network-attached file server, while in other embodiments data store 110 can be some other type of persistent storage such as an object-oriented database, a relational database, and so forth, that may be hosted by conference platform 120, broadcasting system 125, or one or more different machines (e.g., the server 130) coupled to the conference platform 120 or the broadcasting system 125 via network 104. In some implementations, the data store 110 can store portions of audio streams provided by the client devices 102A-102N for the conference platform 120 and/or the broadcasting system 125. Moreover, the data store 110 can store various types of documents, such as a slide presentation, a text document, a spreadsheet, or any suitable electronic document (e.g., an electronic document including text, tables, videos, images, graphs, slides, charts, software programming code, designs, lists, plans, blueprints, maps, etc.). These documents may be shared with users of the client devices 102A-102N and/or concurrently editable by the users.

Conference platform 120 can enable users of client devices 102A-102N and/or client device(s) 104 to connect with each other via a conference (e.g., a conference 120A). A conference refers to a real-time communication session such as a video conference call, also known as a video-based call or video chat, in which participants can connect with multiple additional participants in real-time and be provided with audio and video capabilities. Real-time communication refers to the ability for users to communicate (e.g., exchange information) instantly without transmission delays and/or with negligible (e.g., milliseconds or microseconds) latency. Conference platform 120 can allow a user to join and participate in a conference call with other users of the platform. Embodiments of the present disclosure can be implemented with any number of participants connecting via the conference (e.g., up to one hundred or more).

The client devices 102A-102N may each include computing devices such as personal computers (PCs), laptops, mobile phones, smartphones, tablet computers, netbook computers, network-connected televisions, hearing devices, audio assistive devices, haptic assistive devices, etc. In some implementations, client devices 102A-102N may also be referred to as "user devices." Each client device 102A-102N can include an audiovisual component that can generate audio data and/or video data to be streamed to conference platform 120. In some implementations, the audiovisual component can include a device (e.g., a microphone) to capture an audio signal representing speech of a user and generate audio data (e.g., an audio file or audio stream) based on the captured audio signal. The audiovisual component can include another device (e.g., a speaker 129A-129N) to output audio data to a user associated with a particular client device 102A-102N. In some implementations, the audiovisual component can also include an image capture device (e.g., a camera 127A-127N) to capture images and generate video data (e.g., a video stream) of the captured data of the captured images. In some implementations, the image capture device can be controlled by an image capture device driver that is configured to control the image capture device. The driver can be a software component included in each client device 102A-102N that interfaces between an operating system (OS) of each client device 102A-102N and each of the camera(s) 127A-127N.

In some embodiments, conference platform 120 is coupled, via network 104, with one or more client devices 104 that are each associated with a physical conference or meeting room. Client device(s) 104 may include or be coupled to a media system 132 that may comprise one or more display devices 136, one or more speakers 140 and one or more cameras 144. Display device 136 can be, for example, a smart display or a non-smart display (e.g., a display that is not itself configured to connect to network 104). Users that are physically present in the room can use media system 132 rather than their own devices (e.g., client devices 102A-102N) to participate in a conference (e.g., a video conference), which may include other remote users. For example, the users in the room that participate in the conference may control the display 136 to show a presentation (e.g., a slide presentation) or watch presentations of other participants. Sound and/or camera control can similarly be performed. Similar to client devices 102A-102N, client device(s) 104 can generate audio and video data to be streamed to conference platform 120 (e.g., using one or more microphones, speakers 140, and cameras 144).

Each client device 102A-102N or 104 can include a web browser and/or a client application (e.g., a mobile application, a desktop application, etc.). In some implementations, the web browser and/or the client application can present, on a display device 103A-103N of client device 102A-102N, a user interface (UI) (e.g., a UI of the UIs 124A-124N) for users to access conference platform 120. For example, a user of client device 102A can join and participate in a conference via a UI 124A presented on the display device 103A by the web browser or client application. Transcriptions of audio data can be presented to participants of the conference via each of the UIs 124A-124N.

In some implementations, server 150 can include a transcription manager 122. Transcription manager 122 is configured to generate transcriptions of audio data for presentation at a client device (e.g., client devices 102A-102N or 104). In some implementations, transcription manager 122 can provide transcriptions of audio data to be presented to participants of the conference via each of the UIs 124A-124N. Transcription manager 122 can also collect and provide data associated with the conference 120A to each participant of the conference 120A. Transcription manager 122 can also collect and provide data associated with the broadcasting system 125 to one or more users of the broadcasting system 125. In some implementations, transcription manager 122 can provide the UIs 124A-124N for presentation by a client application (e.g., a mobile application, a desktop application, etc.). For example, the UIs 124A-124N can be displayed on a display device 103A-103N by a native application executing on the operating system of the client device 102A-102N or the client device 104. The native application may be separate from a web browser. In some implementations, transcription manager 122 can include a diarization component that can perform diarization on the audio data, e.g., to identify speakers of the audio data who are in different physical locations (e.g., different meeting rooms) and speakers of the audio data who are in the same physical location (e.g., the same meeting room), or to identify directional information such as where the speakers of the audio data sit or are located.

In some embodiments, transcription manager 122 can receive audio streams provided by audio sources of one or more client devices 102A-102N or 104 of a set of users. The transcription manager 122 can determine sensory modality information pertaining to a user of the set of users. The sensory modality information can include auditory, visual, or haptic characteristics of the user. The transcription manager 122 can determine, using a machine learning model (e.g., model 160A-N) trained on speech of the first user, audio data corresponding to the user and additional audio data corresponding to other users. The transcription manager 122 can provide at least one transcription of the audio data corresponding to the user and/or transcription(s) of the additional audio data corresponding to the other users for presentation at a client device according to the auditory, visual, or haptic characteristics of the user.

Training data generator 131 (i.e., residing at server machine 130) can generate training data to be used to train model 160. Model 160 can be implemented by one or more neural networks accessible to transcription manager 122 (e.g., to determine audio data from audio streams that correspond to a particular user and additional audio data from the audio streams that correspond to other users). In some embodiments, training data generator 131 can generate the training data based on previous speech of the particular user (e.g., stored at data store 110 or another data store connected to system 100 via network 104).

Server machine 133 can include a training engine 141. Training engine 141 can train a machine learning model 160A-N using the training data from training data generator 131. In some embodiments, the machine learning model 160A-N can refer to the model artifact that is created by the training engine 141 using the training data that includes training inputs and corresponding target outputs (correct answers for respective training inputs such as the identifier of a particular user). The training engine 141 can find patterns in the training data that map the training input to the target output (the answer to be predicted), and provide the machine learning model 160A-N that captures these patterns. The machine learning model 160A-N can be composed of, e.g., a single level of linear or non-linear operations (e.g., a support vector machine (SVM or may be a deep network, i.e., a machine learning model that is composed of multiple levels of non-linear operations). An example of a deep network is a neural network with one or more hidden layers, and such a machine learning model can be trained by, for example, adjusting weights of a neural network in accordance with a backpropagation learning algorithm or the like. In other or similar embodiments, the machine learning model 160A-N can refer to the model artifact that is created by training engine 141 using training data that includes training inputs. Training engine 141 can find patterns in the training data, identify clusters of data that correspond to the identified patterns, and provide the machine learning model 160A-N that captures these patterns. Machine learning model 160A-N can use one or more of support vector machine (SVM), Radial Basis Function (RBF), clustering, supervised machine learning, semi-supervised machine learning, unsupervised machine learning, k-nearest neighbor algorithm (k-NN), linear regression, random forest, neural network (e.g., artificial neural network), a boosted decision forest, etc.

In some implementations, conference platform 120 and/or server 130 can be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to enable a user to connect with other users via a conference. Conference platform 120 may also include a website (e.g., a webpage) or application back-end software that may be used to enable a user to connect with other users via the video conference. In some embodiments, the broadcasting system 125 can be a transcription broadcasting system that is included on the server 130.

It should be noted that in some other implementations, the functions of server 130 or conference platform 120 may be provided by a fewer number of machines. For example, in some implementations, server 130 may be integrated into a single machine, while in other implementations, server 130 may be integrated into multiple machines. In addition, in some implementations, server 130 may be integrated into conference platform 120.

In general, functions described in implementations as being performed by conference platform 120 or server 130 can also be performed by the client devices 102A-N and/or client device(s) 104 in other implementations, if appropriate. In addition, the functionality attributed to a particular component can be performed by different or multiple components operating together. Conference platform 120 and/or server 130 can also be accessed as a service provided to other systems or devices through appropriate application programming interfaces, and thus is not limited to use in websites.

In implementations of the disclosure, a "user" may be represented as a single individual. However, other implementations of the disclosure encompass a "user" being an entity controlled by a set of users and/or an automated source. For example, a set of individual users federated as a community in a social network may be considered a "user." In another example, an automated consumer may be an automated ingestion pipeline, such as a topic channel, of the conference platform 120.

In situations in which the systems discussed here collect personal information about users, or may make use of personal information, the users may be provided with an opportunity to control whether conference platform 120 collects user information (e.g., information about a user's social network, social actions or activities, profession, a user's preferences, or a user's current location), or to control whether and/or how to receive content from the server 130 that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the conference platform 120 and/or server 130.

FIG. 2 depicts a flow diagram of a method for generating transcriptions of audio data for presentation at a client device, in accordance with implementations of the present disclosure. Method 200 may be performed by processing logic that may include hardware (circuitry, dedicated logic, etc.), software (e.g., instructions run on a processing device), or a combination thereof. In one implementation, some or all the operations of method 200 may be performed by one or more components of system 100 of FIG. 1 (e.g., platform 120, broadcasting system 125, server 150 and/or transcription manager 122).

For simplicity of explanation, the method 200 of this disclosure is depicted and described as a series of acts. However, acts in accordance with this disclosure can occur in various orders and/or concurrently, and with other acts not presented and described herein. Furthermore, not all illustrated acts may be required to implement the method 200 in accordance with the disclosed subject matter. In addition, those skilled in the art will understand and appreciate that the method 200 could alternatively be represented as a series of interrelated states via a state diagram or events. Additionally, it should be appreciated that the method 200 disclosed in this specification are capable of being stored on an article of manufacture (e.g., a computer program accessible from any computer-readable device or storage media) to facilitate transporting and transferring such method to computing devices. The term "article of manufacture," as used herein, is intended to encompass a computer program accessible from any computer-readable device or storage media.

At block 210, the processing logic receives one or more audio streams. In some embodiments, the one or more audio streams can be provided by one or more audio sources of one or more client devices of a set of client devices (e.g., client devices 102A-N and/or 104) of a set of users. Each audio stream can correspond to audio data collected by a microphone of the client device and subsequently encoded (e.g., compressed and packetized) for transmission over a network. The audio data can be encoded according to a standard such as MP3, etc. An audio source can include another user, a participant of a conference, environmental sounds (e.g., dog barking, baby crying, thunder, etc.), a public address (PA) system, etc. In some embodiments, the set of users can be users of a broadcasting system (e.g., the broadcasting system 125 of FIG. 1).

At block 220, the processing logic determines sensory modality information pertaining to a user (e.g., a first user) of the set of users. In some embodiments, the sensory modality information includes one or more of auditory, visual, or haptic characteristics of the first user. For example, referring to FIG. 3A, sensory modality information 311 can include a user profile 311a, sensors 311b, acoustic model 311c (e.g., machine learning models, such as model 160A-N of FIG. 1), broadcast type 311d, displays 311e, transcription 311f, sound notification 311g, audio 311h, haptics 311i, and/or sign language 311j.

Referring to FIG. 3B, the user profile 311a can include identification information of a particular user (e.g., the first user), such as the user's name. In some embodiments, the user profile 311a can include selectable user preferences with respect to one or more display options for presenting audio data on a client device. For example, the one or more display options can include whether to display a transcription of the user's speech ("User speech transcribed"); whether to display transcription(s) of other speakers' speech ("Other speaker speech transcribed"); whether to have different display areas for different speakers ("Have different displays for different speakers"); whether to send input to assistive devices and which assistive device ("Send input to assistive devices"). In some embodiments, the user profile 311a can be presented, via a UI (e.g., the UI 124A-124N) of the client device, to the user. The processing logic can receive, via the UI, the user's input with respect to the user profile 311a. For example, the user can input, select, and/or click on (e.g., by using a mouse, cursor, and/or touchscreen of the client device) selectable UI elements to modify the user profile 311a according to the user's particular preferences.

Referring to FIG. 3C, the broadcast type 311d can include different applications and/or systems to which to receive and/or provide and/or broadcast transcriptions of audio data from the one or more audio streams. For example, the broadcast type 311d can include one or more conference applications, such as application 1, application 2, application 3. The broadcast type 311d can include one or more public address (PA) systems, such as PA system 1 (e.g., an airport), PA system 2 (e.g., a shop), PA system 3 (e.g., a movie theater). In some embodiments, the broadcast type 311d can be presented, via the UI of the client device, to the user. The processing logic can receive, via the UI, the user's input with respect to the broadcast type 311d. For example, the user can input, select, and/or click on (e.g., by using a mouse, cursor, and/or touchscreen of the client device) selectable UI elements to modify the broadcast type 311*d* according to the user's particular preferences.

Figure 3D:
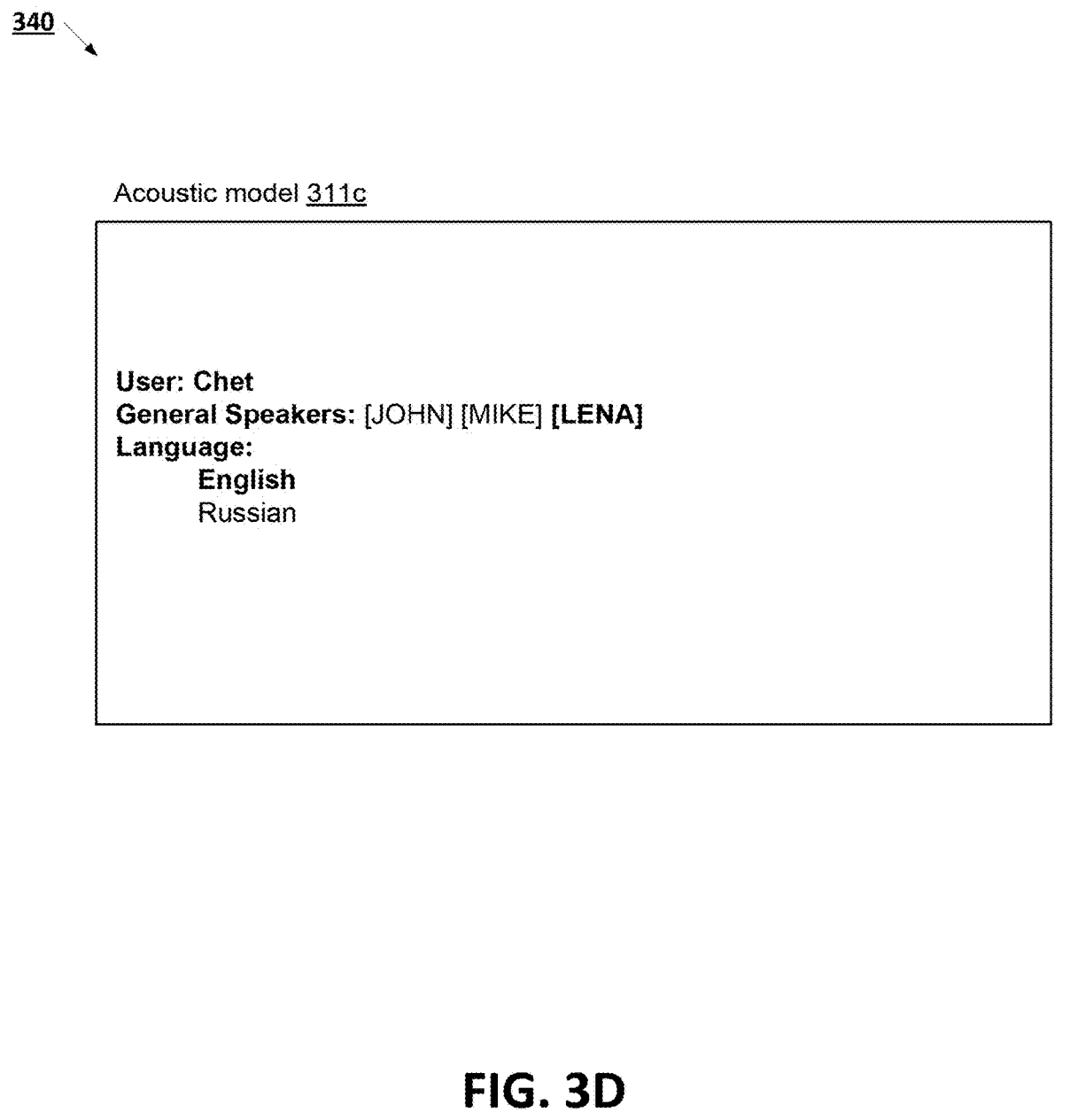

Referring to FIG. 3D, the acoustic model 311*c* can include a specific acoustic model (e.g., a machine learning model, such as model 160A-N of FIG. 1) that is trained on speech of the user to identify audio data corresponding to the user and additional audio data corresponding to other users. In some embodiments, the acoustic model can be trained on speech of the user to identify certain words, topics, etc. that the user wants to be transcribed from audio data. In some embodiments, the acoustic model 311*c* can be presented, via the UI of the client device, to the user for customization.

Referring to FIG. 3E, the sensors 311*b* can include different types of assistive devices for the user. For example, the sensors 311*b* can include a hearing device, a cochlear implant, a haptic device, etc. In some embodiments, the sensors 311*b* can be presented, via the UI of the client device, to the user. The processing logic can receive, via the UI, the user's input with respect to the sensors 311*b*. For example, the user can input, select, and/or click on (e.g., by using a mouse, cursor, and/or touchscreen of the client device) selectable UI elements to modify the sensors 311*b* according to the user's particular preferences.

Figure 3F:
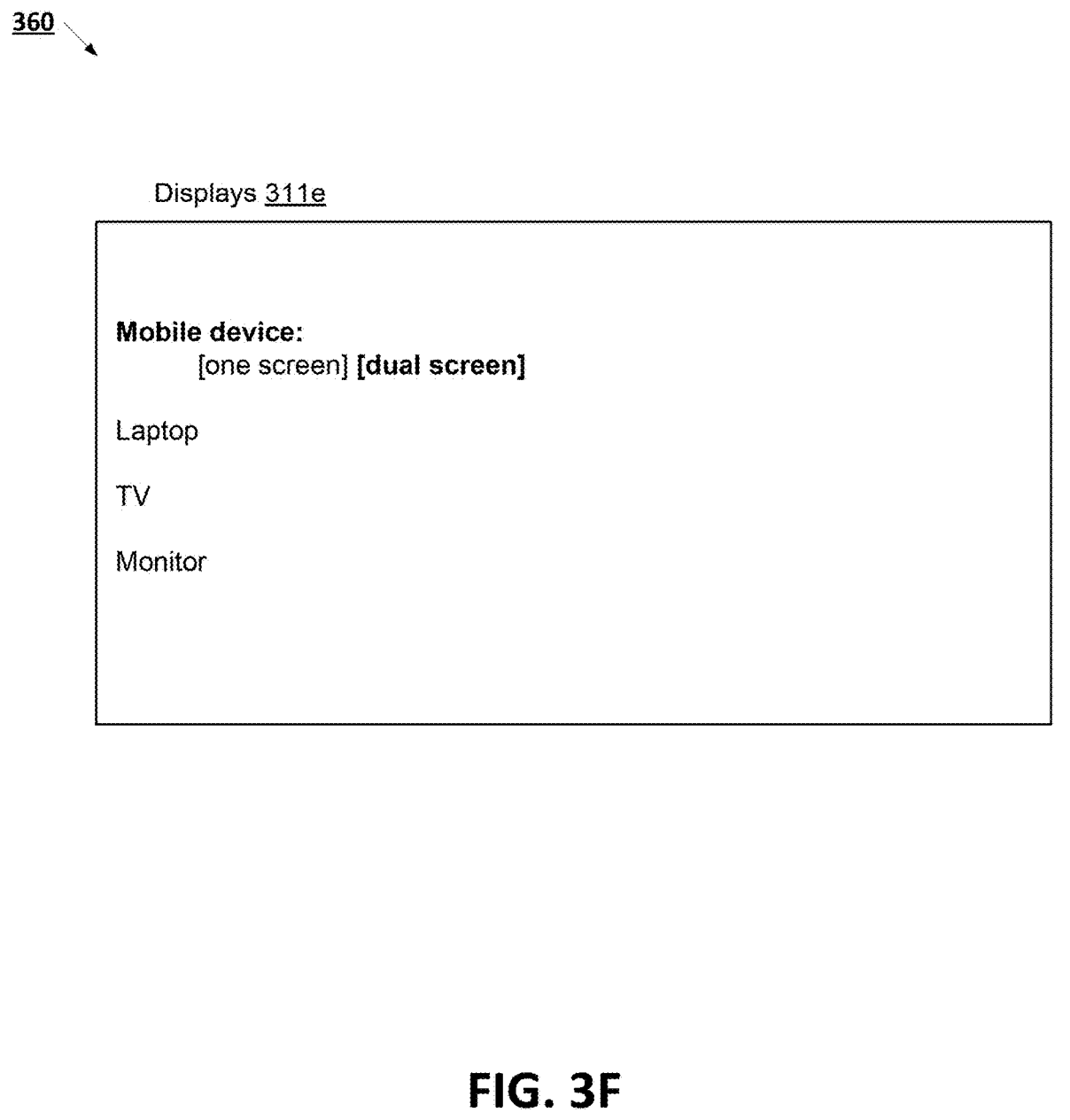

Referring to FIG. 3F, the displays 311*e* can include different types of devices that can be used to display data (e.g., transcriptions) for the user. For example, the displays 311*e* can include a mobile device, including mobile devices with dual screen capabilities, a laptop device, a television, an external monitor, a desktop device (not illustrated), etc. In some embodiments, the displays 311*e* can be presented, via the UI of the client device, to the user. The processing logic can receive, via the UI, the user's input with respect to the displays 311*e*. For example, the user can input, select, and/or click on (e.g., by using a mouse, cursor, and/or touchscreen of the client device) selectable UI elements to modify the displays 311*e* according to the user's particular preferences.

At block 230, the processing logic determines audio data (e.g., first audio data) that corresponds to the first user from the one or more audio streams received at block 220. In some embodiments, the processing logic determines additional audio data that corresponds to other users of the set of users from the one or more audio streams received at block 220. Determining the first audio data and the additional audio data can be performed using one or more machine learning models (e.g., a model 160A-N of FIG. 1). The one or more audio streams can be provided as input to the one or more machine learning models, and at least one of one or more machine learning models can output the first audio data corresponding to the first user and/or the additional audio data corresponding to the other users.

In some embodiments, a machine learning model (e.g., a first machine learning model) of the one or more machine learning models can be trained on speech of the first user. For example, in some embodiments, a training engine (e.g., the training engine 141 of FIG. 1) can train the machine learning model using training data from a training data generator (e.g., the training data generator 131 of FIG. 1). In some embodiments, the training data can include previous speech data of the first user. In some embodiments, the machine learning model can refer to the model artifact that is created by the training engine using the training data that includes training inputs and corresponding target outputs (correct answers for respective training inputs such as the identifier of a particular user). The training engine can find patterns in the training data that map the training input to the target output (the answer to be predicted), and provide the machine learning model that captures these patterns. The machine learning model can be composed of, e.g., a single level of linear or non-linear operations (e.g., a support vector machine (SVM or may be a deep network, i.e., a machine learning model that is composed of multiple levels of non-linear operations). An example of a deep network is a neural network with one or more hidden layers, and such a machine learning model can be trained by, for example, adjusting weights of a neural network in accordance with a backpropagation learning algorithm or the like. In other or similar embodiments, the machine learning model can refer to the model artifact that is created by training engine using training data that includes training inputs. Training engine can find patterns in the training data, identify clusters of data that correspond to the identified patterns, and provide the machine learning model that captures these patterns. Machine learning model can use one or more of support vector machine (SVM), Radial Basis Function (RBF), clustering, supervised machine learning, semi-supervised machine learning, unsupervised machine learning, k-nearest neighbor algorithm (k-NN), linear regression, random forest, neural network (e.g., artificial neural network), a boosted decision forest, etc.

Figure 4:
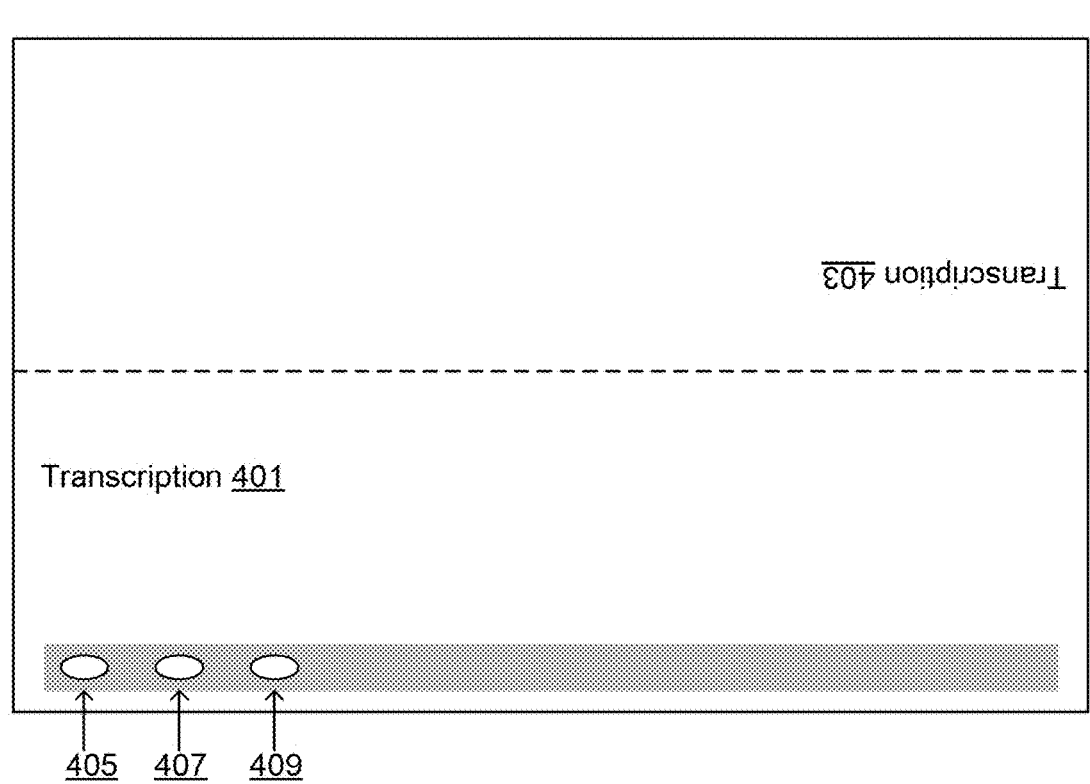
FIG. 4 illustrates an example UI of a client device displaying one or more transcriptions, in accordance with implementations of the present disclosure.

At block 240, the processing logic provides at least one of a transcription (e.g., a first transcription) of the first audio data or one or more additional transcriptions of one or more of the additional audio data for presentation at a client device (e.g., a first client device). In some embodiments, the processing logic provides the at least one of the first transcription and the one or more additional transcriptions for presentation at the client device according to the auditory, visual, or haptic characteristics of the first user that are included in the sensory modality information pertaining to the first user. In some embodiments, the processing logic provides the at least one of the first transcription or the one or more additional transcriptions for presentation on a UI (e.g., the UI 124A-N of FIG. 1) of the client device. In some embodiments, the UI includes one or more display areas, where each display area can display one of the first transcription or the one or more additional transcriptions. In some embodiments, the UI includes one or more UI elements that are selectable to each user. The one or more UI elements can include a selectable option to select which of the first transcription or the one or more additional transcriptions to display on a particular display area. The one or more UI elements can include a selectable option to select whether to display descriptive information pertaining to the sensory modality information of the first user (e.g., one or more of the components of the sensory modality information 311 of FIGS. 3A-3F). Referring to FIG. 4, the UI can include a dual screen display area on the client device, where the first transcription is displayed on one screen of the dual screen area (e.g., transcription 401), and one of the one or more additional transcriptions is displayed on the second screen of the dual screen area (e.g., 403). In some embodiments, the transcription 403 displayed on the second screen of the dual screen area is presented in the opposite direction of the transcription 401 displayed on the other screen. In some embodiments, the UI can include one or more selectable UI elements, such as 405, 407, 409. The one or more selectable UI elements can include a language option, a volume option, an "exit" dual screen option, etc.

In some embodiments, providing the at least one of the first transcription or the one or more additional transcriptions for presentation at the client device includes providing a summary of the at least one of the first transcription or the one or more additional transcriptions (e.g., information pertinent to the first user based on the sensory modality information of the first user).

In some embodiments, providing the at least one of the first transcription or the one or more additional transcriptions for presentation at the client device includes broadcasting the at least one of the first transcription and the one or more additional transcriptions to a conference meeting (e.g., conference 120A), where the first user is a participant of the conference meeting.

In some embodiments, providing the at least one of the first transcription or the one or more additional transcriptions for presentation at the client device includes providing one or more sign language visual aids that correspond to the at least one of the first transcription and the one or more additional transcriptions according to the auditory, visual, or haptic characteristics of the first user.

In some embodiments, the processing logic can provide one or more sound notifications (e.g., text labels of the first audio data and/or the additional audio data) for presentation at the first client device according to the auditory, visual, or haptic characteristics of the first user. In some embodiments, the processing logic provides the text labels for audio data that is local to the first user. In some embodiments, for each user of the set of users who are remote (e.g., participants of a conference), the processing logic provides sound reactions (e.g., laughter, crying, screaming, etc.) for audio data provided during the conference.

In some embodiments, the one or more audio streams received at block 210 can be provided as input to a second machine learning model (e.g., a machine learning model 160A-N of FIG. 1), and the machine learning model can output second audio data corresponding to another (e.g., second) user and/or additional audio data corresponding to the other users. The processing logic can provide a transcription of the second audio data and/or the additional audio data for presentation at another client device according to the auditory, visual, or haptic characteristics of the second user as specified by sensory modality information pertaining to the second user. In some embodiments, the second machine learning model can be trained on speech of the second user. For example, in some embodiments, a training engine (e.g., the training engine 141 of FIG. 1) can train the machine learning model using training data from a training data generator (e.g., the training data generator 131 of FIG. 1). In some embodiments, the training data can include previous speech data of the second user. In some embodiments, the machine learning model can refer to the model artifact that is created by the training engine using the training data that includes training inputs and corresponding target outputs (correct answers for respective training inputs such as the identifier of a particular user). The training engine can find patterns in the training data that map the training input to the target output (the answer to be predicted), and provide the machine learning model that captures these patterns. The machine learning model can be composed of, e.g., a single level of linear or non-linear operations (e.g., a support vector machine (SVM or may be a deep network, i.e., a machine learning model that is composed of multiple levels of non-linear operations). An example of a deep network is a neural network with one or more hidden layers, and such a machine learning model can be trained by, for example, adjusting weights of a neural network in accordance with a backpropagation learning algorithm or the like. In other or similar embodiments, the machine learning model can refer to the model artifact that is created by training engine using training data that includes training inputs. Training engine can find patterns in the training data, identify clusters of data that correspond to the identified patterns, and provide the machine learning model that captures these patterns. Machine learning model can use one or more of support vector machine (SVM), Radial Basis Function (RBF), clustering, supervised machine learning, semi-supervised machine learning, unsupervised machine learning, k-nearest neighbor algorithm (k-NN), linear regression, random forest, neural network (e.g., artificial neural network), a boosted decision forest, etc.

FIG. 3A is a block diagram illustrating example audio, visual, or haptic characteristics comprised by sensory modality information of a user, in accordance with implementations of the present disclosure. FIG. 3A is described with respect to FIG. 2 herein above.

FIG. 3B is a block diagram illustrating an example user interface (UI) of a client device displaying example audio, visual, or haptic characteristics comprised by sensory modality information of a user, in accordance with implementations of the present disclosure. FIG. 3B is described with respect to FIG. 2 herein above.

FIG. 3C is a block diagram illustrating another example user interface (UI) of a client device displaying example audio, visual, or haptic characteristics comprised by sensory modality information of a user, in accordance with implementations of the present disclosure. FIG. 3C is described with respect to FIG. 2 herein above.

FIG. 3D is a block diagram illustrating another example user interface (UI) of a client device displaying example audio, visual, or haptic characteristics comprised by sensory modality information of a user, in accordance with implementations of the present disclosure. FIG. 3D is described with respect to FIG. 2 herein above.

FIG. 3E is a block diagram illustrating another example user interface (UI) of a client device displaying example audio, visual, or haptic characteristics comprised by sensory modality information of a user, in accordance with implementations of the present disclosure. FIG. 3E is described with respect to FIG. 2 herein above.

FIG. 3F is a block diagram illustrating another example user interface (UI) of a client device displaying example audio, visual, or haptic characteristics comprised by sensory modality information of a user, in accordance with implementations of the present disclosure. FIG. 3F is described with respect to FIG. 2 herein above.

FIG. 4 illustrates an example user interface (UI) 400 of a client device (e.g., client devices 102A-102N and/or 104) displaying one or more transcriptions, in accordance with implementations of the present disclosure. The UI 400 can be generated by the transcription manager 122 of FIG. 1 for presentation at the client device. Accordingly, the UI 400 can be generated by one or more processing devices of the server 150 of FIG. 1. In some implementations, the transcription manager 122 can provide the UI 400 to enable participants to join and participate in a conference. Alternatively, the UI 400 can be generated by a conferencing application hosted by the client device (e.g., client devices 102A-102N and/or 104).

Figure 5:
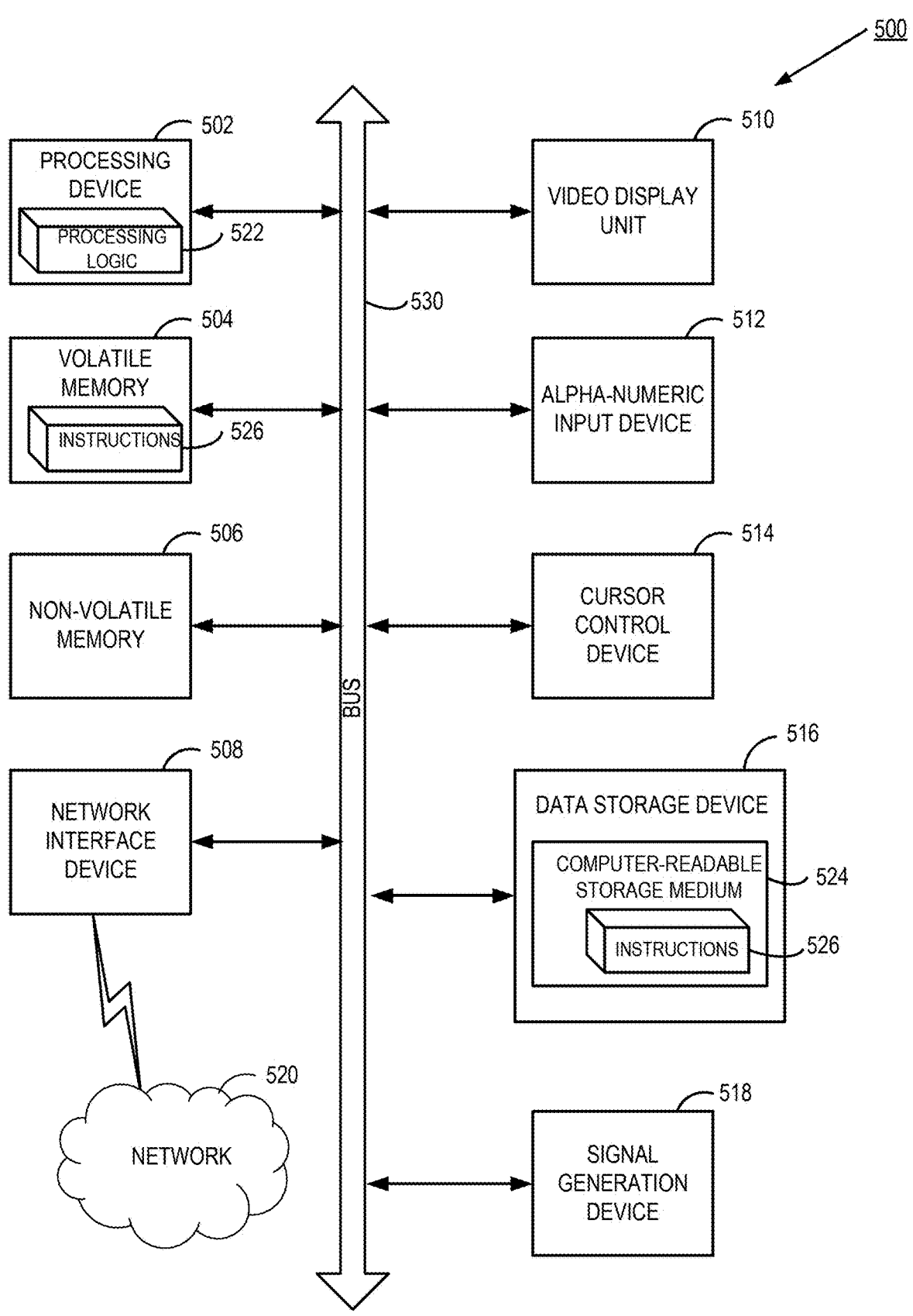
FIG. 5 is a block diagram illustrating an exemplary computer system, in accordance with implementations of the present disclosure.

FIG. 5 is a block diagram illustrating an exemplary computer system, in accordance with implementations of the present disclosure. The computer system 500 can be the server 130, 133, and/or 150 or client devices 102A-N and/or 104 in FIG. 1. The machine can operate in the capacity of a server or an endpoint machine in endpoint-server network environment, or as a peer machine in a peer-to-peer (or distributed) network environment. The machine can be a television, a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 500 includes a processing device (processor) 502, a main memory 504 (e.g., read-only memory (ROM), flash memory, dynamic random access memory (DRAM) such as synchronous DRAM (SDRAM), double data rate (DDR SDRAM), or DRAM (RDRAM), etc.), a static memory 506 (e.g., flash memory, static random access memory (SRAM), etc.), and a data storage device 518, which communicate with each other via a bus 540.

Processor (processing device) 502 represents one or more general-purpose processing devices such as a microprocessor, central processing unit, or the like. More particularly, the processor 502 can be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 502 can also be one or more special-purpose processing devices such as an application specific integrated circuit (ASIC), a field programmable gate array (FPGA), a digital signal processor (DSP), network processor, or the like. The processor 502 is configured to execute instructions 505 (e.g., for generating transcriptions of audio data for presentation at a client device) for performing the operations discussed herein.

The computer system 500 can further include a network interface device 508. The computer system 500 also can include a video display unit 510 (e.g., a liquid crystal display (LCD) or a cathode ray tube (CRT)), an input device 512 (e.g., a keyboard, and alphanumeric keyboard, a motion sensing input device, touch screen), a cursor control device 514 (e.g., a mouse), and a signal generation device 520 (e.g., a speaker).

The data storage device 518 can include a non-transitory machine-readable storage medium 524 (also computer-readable storage medium) on which is stored one or more sets of instructions 505 (e.g., for generating transcriptions of audio data for presentation at a client device) embodying any one or more of the methodologies or functions described herein. The instructions can also reside, completely or at least partially, within the main memory 504 and/or within the processor 502 during execution thereof by the computer system 500, the main memory 504 and the processor 502 also constituting machine-readable storage media. The instructions can further be transmitted or received over a network 530 via the network interface device 508.

In one implementation, the instructions 505 include instructions for generating transcriptions of audio data for presentation at a client device. While the computer-readable storage medium 524 (machine-readable storage medium) is shown in an exemplary implementation to be a single medium, the terms "computer-readable storage medium" and "machine-readable storage medium" should be taken to include a single medium or multiple media (e.g., a centralized or distributed database, and/or associated caches and servers) that store the one or more sets of instructions. The terms "computer-readable storage medium" and "machine-readable storage medium" shall also be taken to include any medium that is capable of storing, encoding or carrying a set of instructions for execution by the machine and that cause the machine to perform any one or more of the methodologies of the present disclosure. The terms "computer-readable storage medium" and "machine-readable storage medium" shall accordingly be taken to include, but not be limited to, solid-state memories, optical media, and magnetic media.

Reference throughout this specification to "one implementation," or "an implementation," means that a particular feature, structure, or characteristic described in connection with the implementation is included in at least one implementation. Thus, the appearances of the phrase "in one implementation," or "in an implementation," in various places throughout this specification can, but are not necessarily, referring to the same implementation, depending on the circumstances. Furthermore, the particular features, structures, or characteristics may be combined in any suitable manner in one or more implementations.

To the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), software, a combination of hardware and software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables hardware to perform specific functions (e.g., generating interest points and/or descriptors); software on a computer readable medium; or a combination thereof.

The aforementioned systems, circuits, modules, and so on have been described with respect to interact between several components and/or blocks. It can be appreciated that such systems, circuits, components, blocks, and so forth can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but known by those of skill in the art.

Moreover, the words "example" or "exemplary" are used herein to mean serving as an example, instance, or illustration. Any aspect or design described herein as "exemplary"

is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Finally, implementations described herein include collection of data describing a user and/or activities of a user. In one implementation, such data is only collected upon the user providing consent to the collection of this data. In some implementations, a user is prompted to explicitly allow data collection. Further, the user may opt-in or opt-out of participating in such data collection activities. In one implementation, the collect data is anonymized prior to performing any analysis to obtain any statistical patterns so that the identity of the user cannot be determined from the collected data.

What is claimed is:

1. A method comprising:
receiving, by a broadcasting system, one or more audio streams provided by one or more audio sources of one or more client devices of a plurality of client devices of a plurality of users of the broadcasting system;
determining sensory modality information pertaining to a first user of the plurality of users, wherein the sensory modality information comprises one or more of auditory, visual, or haptic characteristics of the first user;
determining, using one or more machine learning models, first audio data from the one or more audio streams corresponding to the first user and additional audio data from the one or more audio streams corresponding to other users of the plurality of users; and
providing at least one of a first transcription of the first audio data or one or more additional transcriptions of one or more of the additional audio data for presentation at a first client device, wherein the first transcription is generated to satisfy a need of the first user to receive an audio transcription tailored based on the one or more of the auditory, visual, or haptic characteristics of the first user comprised by the sensory modality information.

2. The method of claim 1, wherein the at least one of the first transcription of the first audio data or the one or more additional transcriptions of the one or more of the additional audio data is presented on a user interface (UI) of the first client device, wherein the UI comprises one or more display areas, each to display one of the at least one of the first transcription or the one or more additional transcriptions, and one or more UI elements selectable to (i) display the at least one of the first transcription or the one or more additional transcriptions, and (ii) display descriptive information pertaining to the sensory modality information pertaining to the first user.

3. The method of claim 1, wherein the at least one of the first transcription of the first audio data or the one or more additional transcriptions of the one or more of the additional audio data is broadcasted to a conference meeting, wherein each of the plurality of users is a participant of a plurality of participants of the conference meeting.

4. The method of claim 1, wherein the one or more audio streams are provided by a public address (PA) system connected to the one or more client devices.

5. The method of claim 1, wherein the first client device comprises a hearing device, a computer device, a mobile device, an audio assistive device, or a haptic assistive device.

6. The method of claim 1, further comprising:
providing one or more sign language visual aids for the at least one of the first transcription or the one or more additional transcriptions for presentation at the first client device according to the one or more of the auditory, visual, or haptic characteristics of the first user comprised by the sensory modality information.

7. The method of claim 1, further comprising:
providing one or more sound notifications pertaining to one or more of the first audio data or the additional audio data for presentation at the first client device according to the one or more of the auditory, visual, or haptic characteristics of the first user comprised by the sensory modality information.

8. The method of claim 1, wherein the one or more audio streams provided by the one or more audio sources of the one or more client devices are provided as one or more inputs to the one or more machine learning models.

9. The method of claim 8, wherein the one or more machine learning models comprises a first machine learning model trained, based on speech of the first user, to identify the first audio data from the one or more audio streams corresponding to the first user, and a second machine learning model trained, based on speech of a second user, to identify second audio data from one or more audio streams corresponding to the second user, the method further comprising:
providing the one or more audio streams provided by the one or more audio sources of the one or more client devices as an input to the second machine learning model; and
providing a second transcription of the second audio data for presentation at a second client device according to one or more of auditory, visual, or haptic characteristics of the second user comprised by sensory modality information pertaining to the second user.

10. A broadcasting system comprising:
a memory device; and
a processing device coupled to the memory device, the processing device to perform operations comprising:
receiving one or more audio streams provided by one or more audio sources of one or more client devices of a plurality of client devices of a plurality of users of the broadcasting system;
determining sensory modality information pertaining to a first user of the plurality of users, wherein the sensory modality information comprises one or more of auditory, visual, or haptic characteristics of the first user;
determining, using one or more machine learning models, first audio data from the one or more audio streams corresponding to the first user and additional audio data from the one or more audio streams corresponding to other users of the plurality of users; and
providing at least one of a first transcription of the first audio data or one or more additional transcriptions of one or more of the additional audio data for presentation at a first client device, wherein the first transcription is generated to satisfy a need of the first user to receive an audio transcription tailored based on the one or more of the auditory, visual, or haptic characteristics of the first user comprised by the sensory modality information.

11. The broadcasting system of claim 10, wherein the at least one of the first transcription of the first audio data or the one or more additional transcriptions of the one or more of the additional audio data is presented on a user interface (UI) of the first client device, wherein the UI comprises one or more display areas, each to display one of the at least one of the first transcription or the one or more additional transcriptions, and one or more UI elements selectable to (i) display the at least one of the first transcription or the one or more additional transcriptions, and (ii) display descriptive information pertaining to the sensory modality information pertaining to the first user.

12. The broadcasting system of claim 10, wherein the at least one of the first transcription of the first audio data or the one or more additional transcriptions of the one or more of the additional audio data is broadcasted to a conference meeting, wherein each of the plurality of users is a participant of a plurality of participants of the conference meeting.

13. The broadcasting system of claim 10, wherein the one or more audio streams are provided by a public address (PA) system connected to the one or more client devices.

14. The broadcasting system of claim 10, wherein the first client device comprises a hearing device, a computer device, a mobile device, an audio assistive device, or a haptic assistive device.

15. The broadcasting system of claim 10, wherein the processing device is to perform operations further comprising:

providing one or more sign language visual aids for the at least one of the first transcription or the one or more additional transcriptions for presentation at the first client device according to the auditory, visual, or haptic characteristics of the first user comprised by the sensory modality information.

16. The broadcasting system of claim 10, wherein the processing device is to perform operations further comprising:

providing one or more sound notifications pertaining to one or more of the first audio data or the additional audio data for presentation at the first client device according to the auditory, visual, or haptic characteristics of the first user comprised by the sensory modality information.

17. A non-transitory computer readable storage medium comprising instructions for a server that, when executed by a processing device, cause the processing device to perform operations comprising:

receiving, by a broadcasting system, one or more audio streams provided by one or more audio sources of one or more client devices of a plurality of client devices of a plurality of users of the broadcasting system;

determining sensory modality information pertaining to a first user of the plurality of users, wherein the sensory modality information comprises one or more of auditory, visual, or haptic characteristics of the first user;

determining, using one or more machine learning models, first audio data from the one or more audio streams corresponding to the first user and additional audio data from the one or more audio streams corresponding to other users of the plurality of users; and providing at least one of a first transcription of the first audio data or one or more additional transcriptions of one or more of the additional audio data for presentation at a first client device, wherein the first transcription is generated to satisfy a need of the first user to receive an audio transcription tailored based on the one or more of the auditory, visual, or haptic characteristics of the first user comprised by the sensory modality information.

18. The non-transitory computer readable storage medium of claim 17, wherein the at least one of the first transcription of the first audio data or the one or more additional transcriptions of the one or more of the additional audio data is presented on a user interface (UI) of the first client device, wherein the UI comprises one or more display areas, each to display one of the at least one of the first transcription or the one or more additional transcriptions, and one or more UI elements selectable to (i) display the at least one of the first transcription or the one or more additional transcriptions, and (ii) display descriptive information pertaining to the sensory modality information pertaining to the first user.

19. The non-transitory computer readable storage medium of claim 17, wherein the at least one of the first transcription of the first audio data or the one or more additional transcriptions of the one or more of the additional audio data is broadcasted to a conference meeting, wherein each of the plurality of users is a participant of a plurality of participants of the conference meeting.

20. The non-transitory computer readable storage medium of claim 17, wherein the processing device is to perform operations further comprising:

providing one or more sign language visual aids for the at least one of the first transcription or the one or more additional transcriptions for presentation at the first client device according to the auditory, visual, or haptic characteristics of the first user comprised by the sensory modality information.

* * * * *